United States Patent
Cloutier et al.

(10) Patent No.: US 6,891,852 B1
(45) Date of Patent: May 10, 2005

(54) METHOD OF DYNAMICALLY ADJUSTING THE DURATION OF A BURST TRANSMISSION IN WIRELESS COMMUNICATION SYSTEMS

(75) Inventors: Joseph E. Cloutier, Cedar Knolls, NJ (US); Wen-Yi Kuo, Parsippany, NJ (US); Sudhir Ramakrishna, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/288,006

(22) Filed: Apr. 8, 1999

(51) Int. Cl.[7] .............................. H04J 3/16; H04J 3/24; H04J 3/00; H04B 7/212; H04L 12/43
(52) U.S. Cl. ..................... 370/468; 370/473; 370/345; 370/442; 370/458
(58) Field of Search ................................. 370/468, 473, 370/345, 458, 349, 428, 441–443, 462

(56) References Cited

U.S. PATENT DOCUMENTS

| | | | | |
|---|---|---|---|---|
| 5,384,770 A | * | 1/1995 | Mays et al. ................. | 370/300 |
| 5,418,787 A | * | 5/1995 | Tiuraniemi et al. ......... | 370/336 |
| 5,663,958 A | * | 9/1997 | Ward .......................... | 370/347 |
| 5,729,541 A | * | 3/1998 | Hamalainen et al. ....... | 370/337 |
| 5,781,540 A | * | 7/1998 | Malcolm et al. ............ | 370/321 |
| 5,859,853 A | * | 1/1999 | Carlson ...................... | 370/468 |
| 5,940,397 A | * | 8/1999 | Gritton ....................... | 370/412 |
| 6,034,966 A | * | 3/2000 | Ota ............................ | 370/443 |
| 6,317,435 B1 | * | 11/2001 | Tiedemann et al. ......... | 370/441 |
| 6,370,117 B1 | * | 4/2002 | Koraitim et al. ............ | 370/232 |
| 6,389,038 B1 | * | 5/2002 | Goldberg et al. ........... | 370/471 |

FOREIGN PATENT DOCUMENTS

| EP | 0372795 A | 6/1990 |
|---|---|---|
| EP | 0523362 A | 1/1993 |

* cited by examiner

*Primary Examiner*—Chi Pham
*Assistant Examiner*—Ronald Abelson

(57) ABSTRACT

A method to adjust the burst transmission duration time, in a high speed digital wireless communication system, to provide sufficient time for the transmission of data when all the data is not available at the time of transmission. According to the method of the invention, after the burst transmission is begun, the burst is maintained active as additional data is selected within a known time period following the previous detected data packet and the detected data is appended to the active burst transmission. The invention further terminates the burst duration when no additional data is detected within the redefined time period following the previous detected data packet.

30 Claims, 6 Drawing Sheets

METHOD OF DYNAMICALLY ADJUSTING THE DURATION OF A BURST TRANSMISSION IN WIRELESS COMMUNICATION SYSTEMS

RELATED APPLICATIONS

The present invention is related to U.S. patent application Ser. No. 09/288,364, filed concurrently herewith, entitled INTELLIGENT BURST CONTROL FUNCTIONS FOR WIRELESS COMMUNICATION SYSTEMS, U.S. patent application Ser. No. 09/288,365, entitled METHOD FOR PREMATURE TERMINATION OF BURST TRANSMISSION IN WIRELESS COMMUNICATION SYSTEMS filed concurrently herewith, U.S. patent application Ser. No. 09/288,363, entitled SYSTEM AND METHOD FOR PREVENTION OF REVERSE JAMMING DUE TO LINK IMBALANCE IN WIRELESS COMMUNICATION SYSTEMS, filed concurrently herewith, U.S. patent application Ser. No. 09/288,587, entitled BURST DURATION ASSIGNMENT BASED ON FADING FLUCTUATION AND MOBILITY IN WIRELESS COMMUNICATION SYSTEMS filed concurrently herewith, U.S. patent application Ser. No. 09/288,368, entitled A METHOD OF QUEUE LENGTH BASED BURST MANAGEMENT IN WIRELESS COMMUNICATION SYSTEMS, filed concurrently herewith, all of which are assigned to the same assignee and are incorporated by reference herein.

FIELD OF THE INVENTION

This invention relates to wireless communication systems and, more particularly, to methods for adjusting the duration assigned to a burst transmission in such communication systems.

BACKGROUND OF THE INVENTION

Wireless communication systems have been developed to allow transmission of information signals between an originating location and a destination location. Both analog (first generation) and digital (second generation) systems have been developed to transmit information signals over communication channels linking the source and destination locations. Digital methods tend to afford several advantages over analog systems. For example, improved immunity to channel noise and interference, increased capacity, and encryption for secure communications are advantages of digital systems over analog systems.

While first generation systems were primarily directed to voice communication, second generation systems support both voice and data applications. Numerous techniques are known in second-generation systems for handling data transmissions which have different transmission requirements—data transmission being typically of relatively short duration, as compared to voice transmission, and usually not requiring continuous access to the communication channel. Several modulation/coding arrangements have been developed, such as frequency division multiple access (FDMA), time division multiple access (TDMA) and code division multiple access (CDMA), to increase the number of users that can access a wireless network. CDMA systems are more immune to multiple path distortion and co-channel interference than FDMA and TDMA systems and reduce the burden of frequency/channel planning that is common with FDMA and TDMA systems.

In a CDMA system, a unique binary code sequence is assigned to each active user within a cell to uniquely identify the user and spread the user's signal over a larger bandwidth. Multiplied by the assigned code, the user's signal is spread over the entire channel bandwidth, which is wider than the user signal bandwidth. The ratio of the system channel bandwidth to the user's bandwidth is the "spreading gain" of the system. The capacity of the CDMA system is proportional to the "spreading gain" for a given signal-to-interference (S/I) level. After reception of the transmitted signal, the signal of each user is separated, or de-spread, from the other users' signal by using a correlator keyed to the code sequence of the desired signal.

First-generation analog and second-generation digital systems were designed to support voice communication with limited data communication capabilities. Third-generation wireless systems, using wide-band channel management technologies such as CDMA, are expected to effectively handle a large variety of services, such as voice, video, data and imaging. Among the features which will be supported by third-generation systems is the transmission of high-speed data between a mobile terminal and a land-line network. As is known, high-speed data communications is often characterized by a short transmission "burst" at a high data transmission rate, followed by some longer period of little or no transmission activity from the data source. To accommodate the burst nature of such high-speed data services in third-generation systems, it is necessary for the communications system to assign a large bandwidth segment (corresponding to the high data rate) from time to time for the duration of the data burst. With the ability of the third generation systems to handle such bursty high-speed data transmission, throughput and delay for users can be advantageously improved. However, because of the large amount of instantaneous bandwidth required for transmission of a burst of high-speed data, the management of such bursts, and particularly the allocation of power and system resources thereto, must be handled with care to avoid unwarranted interference with other services using the same frequency allocation.

In allocating power and system resources, the designer of a high speed burst transmission network must consider the effect of the duration assigned to the burst on system resources. By transmitting data packets in bursts—i.e., individual data packets packaged together and transmitted as a single data burst, system resources are conserved as only one transmitter configuration setup is necessary for each data burst. However, bursts that are long in duration, thereby accommodating a large number of data packets in each burst, may result in an unnecessary expenditure of system resources as the burst may continue even after all the data scheduled for transmission within the burst has been transmitted. On the other hand, burst duration times which are relatively short may also cause unnecessary expenditure of system resources as the number of burst transmissions necessary to completely transmit the data message is increased and, correspondingly, the overhead and time delay for transmission of the data are increased.

SUMMARY OF THE INVENTION

It is an object of the invention to improve the utilization of a communications link in a wireless communications system by adapting the allocation of transmission resources in accordance with the data message being transmitted. It is a further object of the invention to provide a method for extending the duration assigned to a burst transmission as additional data becomes available for transmission during the burst transmission. Still a further object of the invention is to a provide a method to terminate the burst transmission when no additional data is available for transmission.

The method of the invention adapts the burst duration to the input data message by increasing the burst duration to transmit any additional data that becomes available during the initial burst transmission assignment. In accordance with the method of the invention, the invention assigns a burst duration that is longer than is necessary to transmit the data currently available for transmission. Such a longer burst duration assignment accommodates the transmission of additional message: data which arrives before the completion of the data burst transmission. Message data arriving before the termination of the data burst is appended to the data allocated to that burst and, if necessary, the duration of the burst is extended beyond the initially assigned duration. Further, the invention provides a means to determine when no additional message data is available for transmission and terminates the burst when no more data is available for transmission.

Thus the invention provides a method to improve channel utilization in a wireless system by dynamically adjusting the duration of the high data-rate bursts and thereby causing a reduction in the number of bursts required to transmit input data messages and a corresponding reduction in overhead and time delay in transmitting the data messages.

DETAILED DESCRIPTION OF THE INVENTION

The focus of early wireless systems, particularly first generation analog systems, was primarily voice communication. With second generation wireless systems, including CDMA, TDMA and GSM, came varying degrees of improvement in terms of voice quality, network capacity and enhanced services. However, while second generation systems are suitable to the provision of voice, low rate data, fax and messaging, they are generally not able to effectively and efficiently address requirements for high speed mobile data rates. The evolution to third generation wireless communications represents, essentially, a paradigm shift to the world of multimedia mobile communications, where users will have access not just to voice services but also to video, image, text, graphic and data communications. The third generation networks are expected to provide mobile users with data rates of between 144 Kbps and 2 Mbps.

Nonetheless, in wireless networks supporting these higher speed data communications applications, channel utilization must be managed very carefully to avoid delays in transmission caused by inefficient channel utilization. As will be shown hereafter, the invention provides a novel methodology to manage the duration of a data burst so as to either extend or foreshorten the burst duration to accommodate either more or less total data packets than anticipated upon burst assignment. The inclusion of additional data into the burst transmission reduces overhead processing as fewer transmissions are necessary to transmit the entire data message. Similarly, an early termination of a burst transmission due to the full data message having been processed in less time than expected makes these transmission resources available to another user and thus promotes operating efficiency for the system.

Although the invention will be hereafter described in terms of a preferred embodiment based on CDMA encoding of the wireless signals, it should be apparent that the methodology of the invention can also be applied for other wireless channelization arrangements, including TDMA and GSM.

Figure 1:
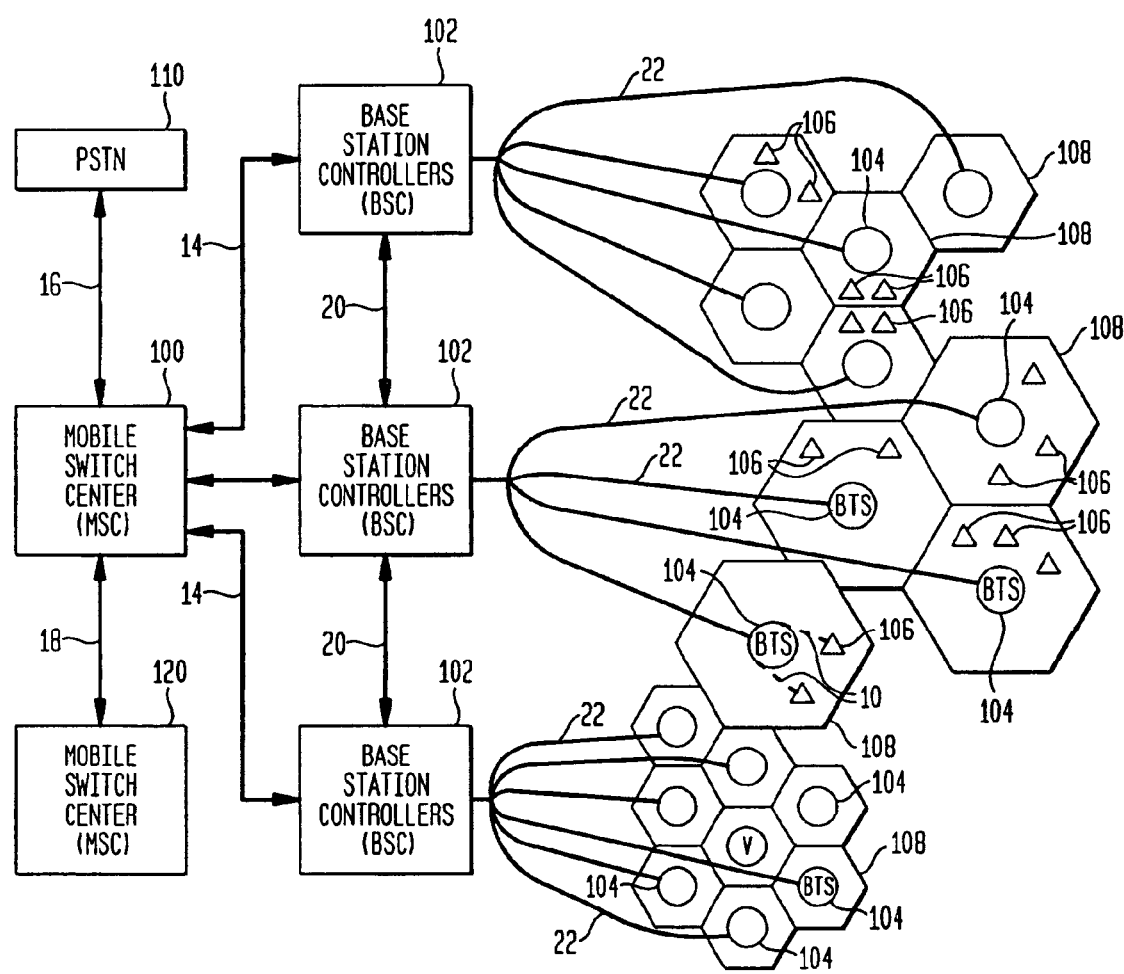
FIG. 1 illustrates a typical structure of a wireless communication system in which the methodology of the invention would be employed.

FIG. 1 illustrates a typical wireless communications system configuration containing a Mobile Switch Center (MSC) 100, a plurality of Base Station Controllers (BSC) 102, a plurality of Base Transceiver Stations (BTS) 104 and multiple remote users, each associated with a Mobile Station (MS) 106. In addition to providing management and control functions for sub-elements of the wireless network, the MSC 100 also provides an interface between the wireless network and a wireline network, PSTN 110, or a second wireless network, MSC 120. The physical connection between each of these network components may be either through a wireline connection, for example, 14, 16, 18, 20 and 22 or a wireless network connection, for example, 10 as illustrated in FIG. 1. The BSC 102 provides control and management functions for one or more BTSs 104 and transfers information between the BTS 104 and the MSC 100. The BTS 104 consists of a set of, usually remotely tunable, transceivers placed at the wireless site, and is the termination point of the radio path on the network side. Each BTS 104 typically provides coverage for a single cell 108 in the wireless network and is in radio communication with the remote users within that cell, as illustrated in FIG. 1.

Mobile Stations 106, such as cellular telephones, computer terminals, fax machines, or pocket computers, terminate the radio path from the BTS 104 and provide access to the network services for the served users. The two way radio link between the BTS 104 and the MS 106, by convention, is designated the forward link whenever the BTS 104 transmits to the MS 106 and the reverse link whenever the MS 106 transmits to the BTS 104.

Figure 2:
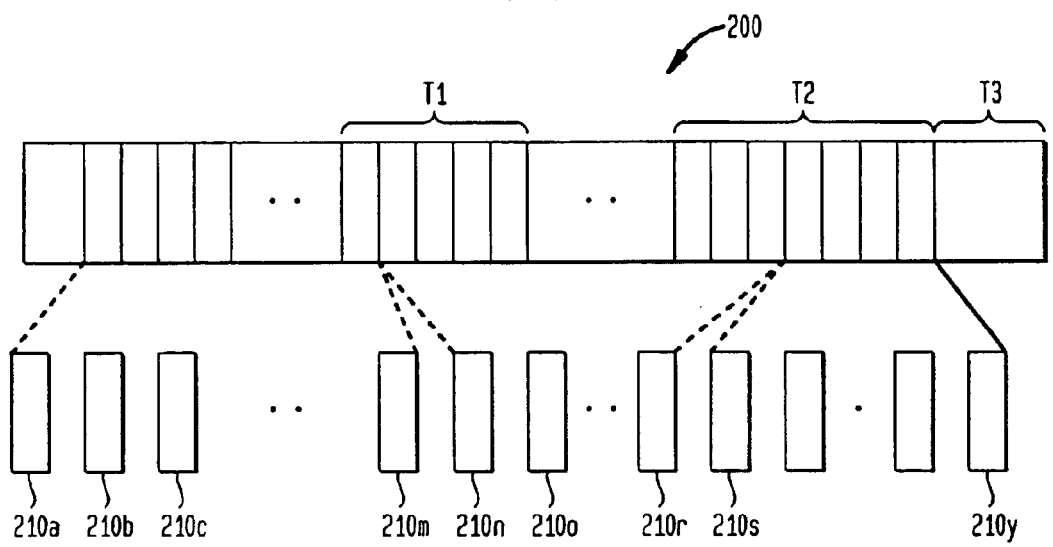
FIG. 2 illustrates a typical digital data message comprised of data packets being serially accumulated in a data buffer or queue prior to transmission

FIG. 2 illustrates a typical user data message being input into data buffer 200 prior to transmission. Data packets 210 represent the data content of the data message, which, for example, can be a digital file from a server, or graphical images which have been scanned and converted into digital format, or video data which is converted into a digital format. The data packets 210, individually labeled 210a through 210y represent the data message entering data buffer 200, wherein data packet 210a is the earliest data packet in time.

Figure 3:
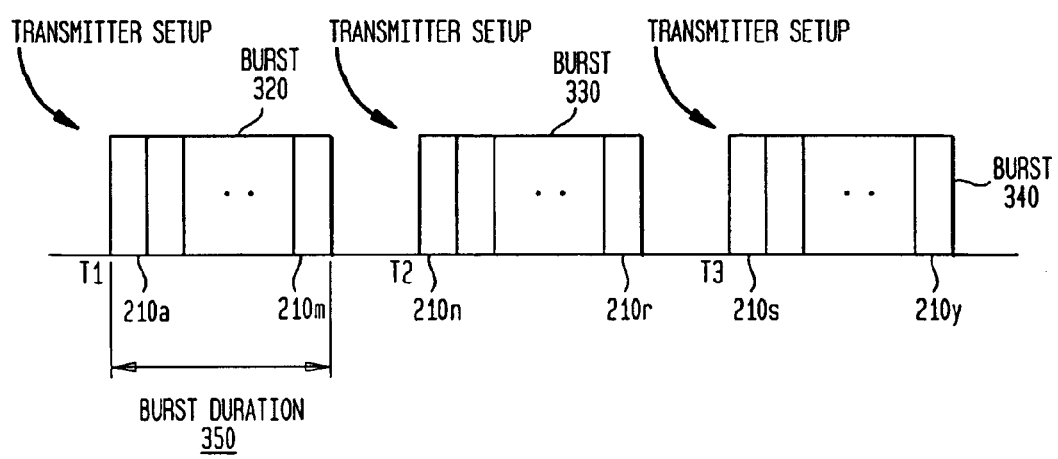
FIG. 3 illustrates a typical input data message comprised of data packets formed into data burst packages and the transmission of each burst package.

In high speed burst transmission arrangements, typically the user's data message is accumulated in data buffer 200 for a finite period of time, the data being thereby collected into a single package for transmission as a single data burst. FIG. 3 illustrates a high speed burst transmission arrangement in which a data message is accumulated, collected and transmitted in bursts. Referring to the data message illustrated in FIG. 2, and repeated in the subsequent FIGS. 3 through 7 for reference, the data message is composed of data packets 210 entered into data buffer 200. In the example illustrated in the combination of FIGS. 2 and 3, data within data buffer 200 is collected and transmitted as a signal burst at three sampling times, $T_1$, $T_2$ and $T_3$. The time between $T_{1\ and\ T2}$ and between $T_2$ and $T_3$ is longer than the rate at which data packets 210 are entering data buffer 200 and a large number of data packets are collected during these periods. The first data burst 320, taken at sample time $T_1$, is composed of data packets 210a through 210m. The second burst 330, taken at sample time $T_2$, is composed of data packets 210n through 210r and the third burst 340, taken at sample time $T_3$, is composed of data packets 210s through 210y. The data bursts are constructed in this form because data packet 210n, although time sequential with regard to data packet 210m, is not available in data buffer 200 at sample time $T_1$ and cannot be included in burst 320. Similarly, at sample time $T_2$, data packet 210s is not available in data buffer 200 and cannot be included in data burst 330. The transmissions of data packets 210n through 210r and data packets 210s through 210y are thus postponed until sample times $T_2$ and $T_3$ respectively, even though these packets are sequential in time and no time gap exists between the data packets.

The rate of data transmission during the data burst is generally significantly faster than the rate the input data is received in data buffer 200. Thus, for the illustrated case, at time $T_1$, the first data burst 320, (i.e., data packets 210a through 210m) is transmitted as a single high speed burst. Similarly, at sample times $T_2$ and $T_3$, bursts 330 and 340, respectively, are transmitted as high speed bursts.

The characteristics of the burst data rate is determined by such system parameters as available output power, transmission data rate, bandwidth and required power per bit for desired quality. The time assigned for the burst transmission, that is, the burst duration time 350 in FIG. 3, depends upon the amount of data being transmitted and the burst data rate chosen for the burst transmission. For a given quantity of data to be transmitted, the higher the data rate chosen to transmit the burst, the shorter is the burst duration 350 and, correspondingly, the time the channel is utilized for the specific user. The specific transmitter configuration of burst rate and duration is set at the time of transmission and may well be different between sequential bursts, even for a common traffic stream.

The method of the invention provides for a more efficient allocation of resources in connection with high data rate burst transmission by anticipating the continued introduction of data packets in buffer 200 and assigning a burst duration time which is larger than necessary to transmit the data available in the buffer 200 at the sampling time.

Figure 4A:
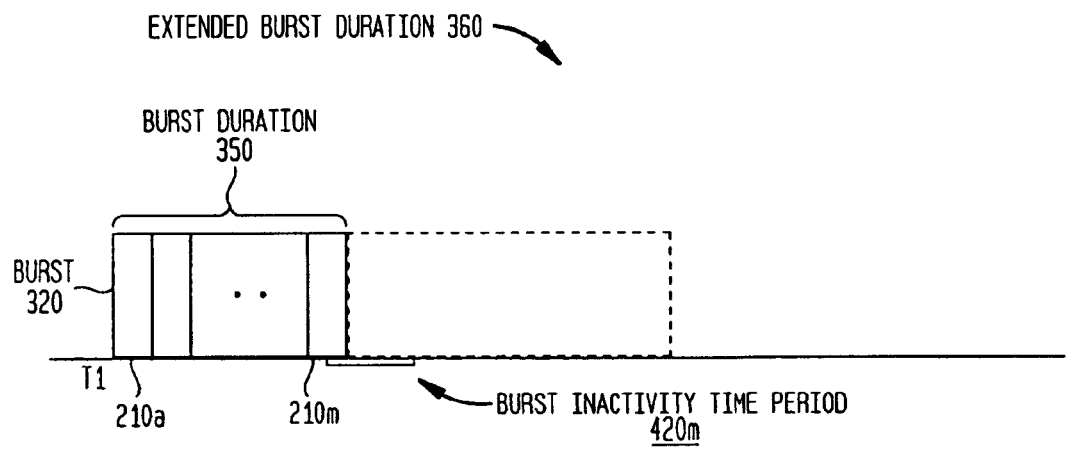
FIG. 4a illustrates an example of the burst duration extension according to the method of the invention.

FIG. 4a illustrates the extension of the burst duration according to the method of the invention. FIG. 2 is again provided as a reference to the processing of FIGS. 4a and 4b. In this example of FIG. 4a, the burst transmission process begins at sample time $T_1$, whereby data packets, 210a through 210m, are compiled into single data burst 320. However, in place of assigning burst duration time 350 (corresponding to presently expected content of the burst transmission) to the burst, an extended burst duration 360 is assigned as the duration of the burst transmission. According to the method of the invention, the extended burst duration time 360 is significantly larger than necessary to transmit the data burst. This extended burst time is illustrated in FIG. 4a as the dashed line extension of the burst duration 350 after data packet 210m. This extension of the data burst maintains the transmitter in the current transmission configuration—i.e., continued allocation to the user of power and bandwidth associated with burst 320—even if no data is being transmitted.

Further, the invention monitors data buffer 200 and initializes a burst inactivity timer for a known period 420, at any point wherein data packets are detected in the buffer. Should the period of the burst inactivity timer expire before an additional data packet is detected in data buffer 200, the method of the invention causes the premature termination of the burst duration.

FIG. 4a provides an illustration of the operation of the invention in which the premature termination of the burst duration occurred. In this exemplary case, data packet 210n was not available in data buffer 200 within the burst inactivity period 420m. Although data packet 210n is time sequential with regard to data packet 210m, the failure of data packet 210n to be timely available in data buffer 200 may be caused by an error in a prior processing. For example, if the data message were a data stream being read from a server and the data comprising data packet 210n were mis-read from the server, a reread of the data packet may be necessary. The re-reading of the data packet may well introduce a delay which exceeds the burst inactivity time period 420m chosen for the input data rate.

Figure 4B:
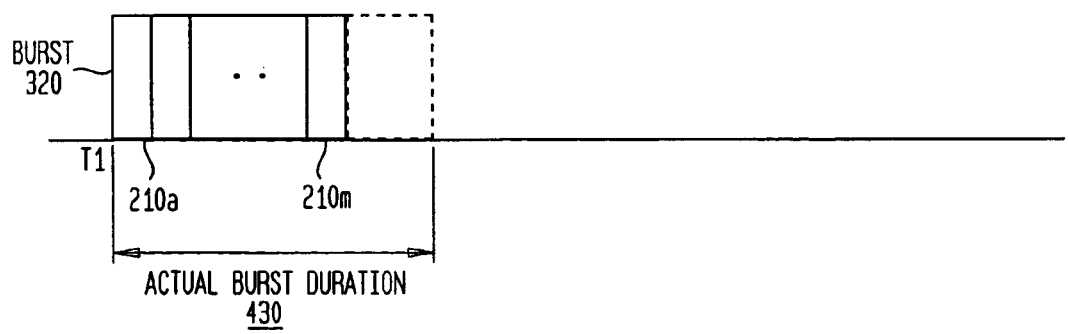
FIG. 4b illustrates an example of the burst termination according to the method of the invention.

The failure to detect data packet 210n within burst inactivity time period 420m causes the termination of burst 320 and releases the transmitter to process another user. As illustrated in FIG. 4b, the burst duration 360 is terminated to the foreshortened actual burst duration 430 as data packet 210n was not detected within the burst inactivity time period 420m.

However, according to the method of the invention, when a data packet is detected within the burst inactivity time period 420, the data packet is annexed to the currently active burst transmission and the burst inactivity time period 420 is restarted.

Figure 5A:
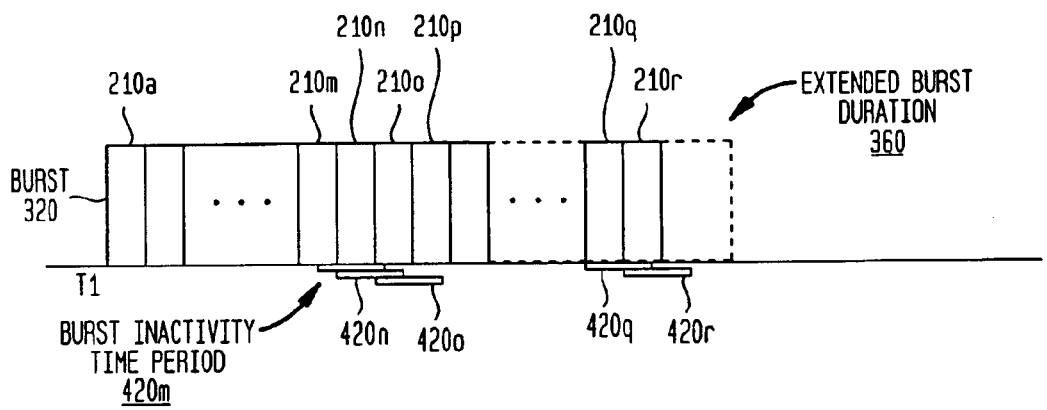
FIG. 5a illustrates an example of annexation of data packets into the extend burst duration according to the method of the invention.

FIG. 5a illustrates an example of the annexation of the data packet 210n to the data 110 burst 320 which was initially composed of data packets 210a through 210m. As illustrated, data packet 210n, which is time sequential to data packet 210m, is transmitted in combination with data packet 210m in data burst transmission 320. Thus, there is no time gap in transmission between data packet 210m and 210n as had been introduced because of the sampling at times $T_1$ and $T_2$ as described in regard to FIG. 3.

The method of the invention continues to annex data packets 210o through 210r into the data burst transmission as these packets are detected within the restarted burst inactivity time periods 420n through 420q in this example. The continued annexation of these data packets into the initial data burst transmission 320 thus enables the transmission of additional data packets without the necessity of additional transmitter setups.

In the embodiment of the invention just described, the burst inactivity time period 420 is restarted upon the detection of the next data packet in data buffer 200. In another embodiment of the invention, the burst inactivity period 420 could also be restarted after the additional data packet has been transmitted. In another embodiment of the invention, the burst inactivity period 420 can be restarted from the last data packet detected if more than one data packet is detected within the inactivity time period 420.

Figure 5B:
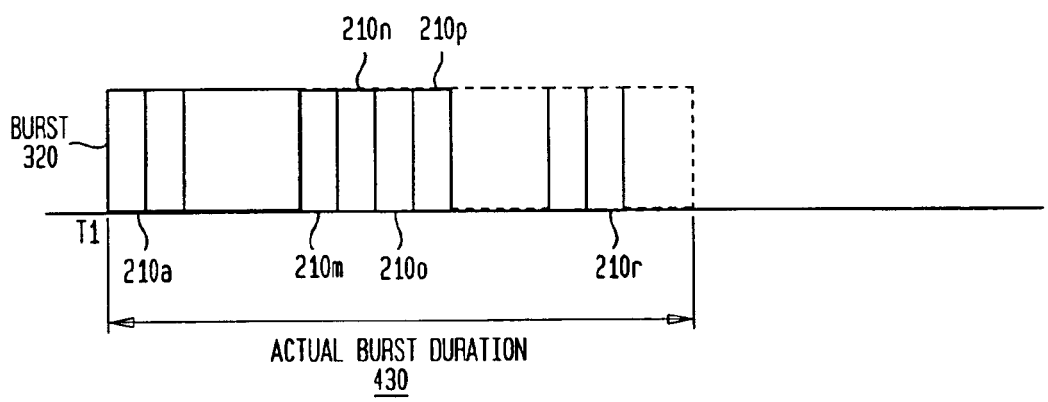
FIG. 5b illustrates an example of the burst termination according to the method of the invention.

The annexation of the data packets into the data burst transmission continues for each data packet that is detected within the time period of the restarted burst inactivity time period 420. Similar to the burst termination process described in conjunction with FIG. 4b, when no data packets are detected within the burst inactivity time period 420, the data burst is terminated. In the example illustrated in FIG. 5b, data packet 210s, having failed to enter data buffer 200 prior to the expiration of the burst inactivity time period 420r, is not included in the extended burst transmission 320 and the burst transmission 320 is terminated. The failure of packet 210s to enter the data buffer in a timely manner could be caused, for example, by an error in data packet 210s and reprocessing of data packet 210s in some prior processing was necessary. For example, the data message being transmitted might be a graphic image that was being converted to digital form by scanning the image, and during the scanning process, an error occurred in the conversion of a line of the image. A re-scanning of the line in error may be necessary and the re-scanning of the line introduces a time delay between data packet 420r and 420s. If the time delay exceeds the burst inactivity time period 420r than according to the method of the invention, and as illustrated in FIG. 5b, the burst is terminated and the burst duration 360 is foreshortened to the actual burst duration 430.

Figure 6:
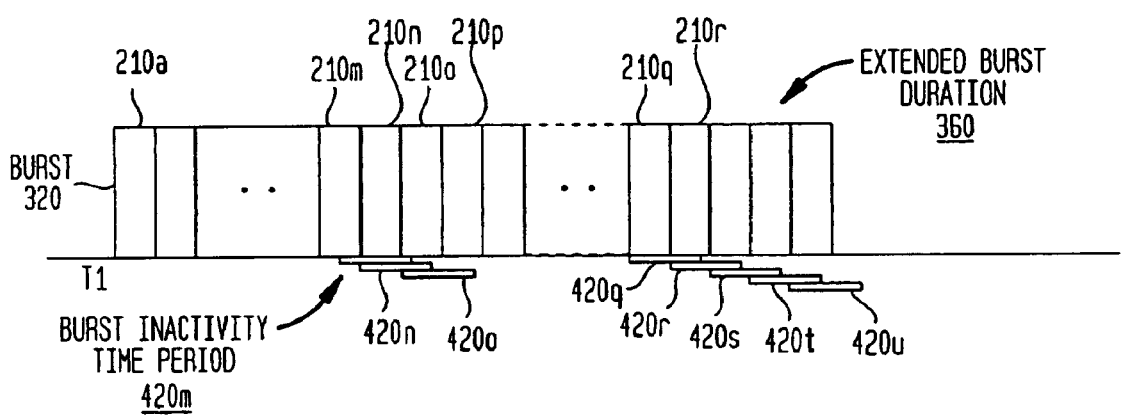
FIG. 6 illustrates a second example of annexation of data packets into the extended burst duration and the natural termination of the burst duration according to the method of the invention.

FIG. 6 illustrates the method of the invention, with reference to the data buffer illustrated in FIG. 2, when data packet 210s timely enters data buffer 200 prior to the expiration of the burst inactivity time period 420r. According to the method of the invention the data packet 210s is annexed into the currently active transmitting data burst and the data burst remains active. Similarly, data packets 210t and 210u being detected within the respective burst inactivity time periods 420s and 420t are annexed into the transmitting data burst. In this embodiment of the invention, at the completion of the extended burst duration time 360, the burst is terminated and data packets 210v through 210y, although continuous in time with regard to the preceding data packets, are not annexed into the data burst 320 and must remain in data buffer 200 awaiting the next burst transmission at the next time sample. The next time sample may be $T_2$, if the burst duration has not exceeded the sampling time period ($T_2-T_1$) or may be computed as the time of the last data packet transmitted offset by the sampling time period ($T_2-T_1$).

Another embodiment of the invention is illustrated in FIG. 7, and with reference again to data packets 210v through 210y, which were beyond the extended burst duration of FIG. 6. In this embodiment of the invention, upon detecting data packet 210v within the burst inactivity time period 420u, burst duration time 360 is further extended resulting in extended burst duration 710 and the annexation of data packet 210v into the data burst transmission. Thus, although the burst would have ended at the assigned extended burst time 360, as was illustrated in FIG. 6, the continued presence of data causes the burst to remain active. According to the method of the invention, the extended burst duration time 360 is extended, either incrementally or as a block, for each subsequent data packet detected.

Figure 7:
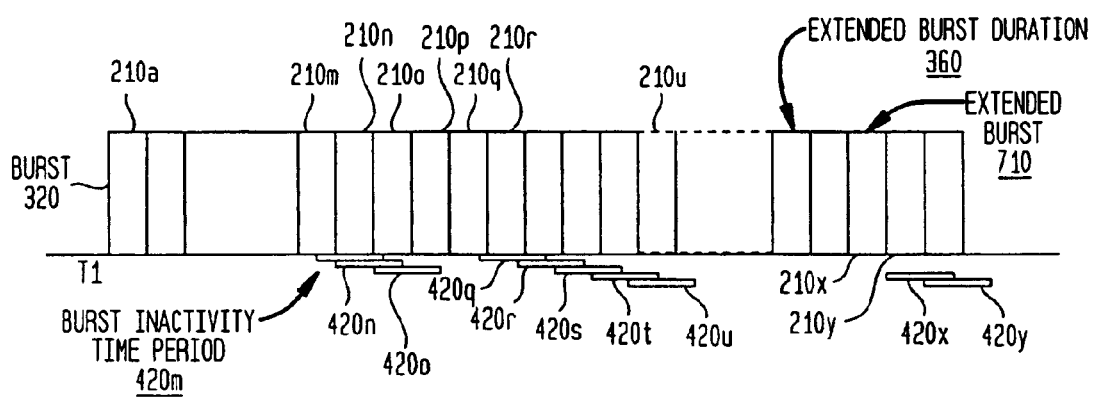
FIG. 7 illustrates an another example of annexation of data packets into the extended burst duration and the continuation of extending the burst duration beyond the initial assigned duration according to the method of the invention.

The process of extending the data burst duration continues until the point where no data is detected within the restarted burst inactivity time 420. Referring to FIG. 7, after data packet 210y is annexed to the data burst and no further data is detected within the expiration of the restarted burst duration time period 420y, the burst is terminated.

Thus, as illustrated in FIG. 7 and explained herein, the transmission of the entire data message can be performed in one continuous burst transmission, as opposed to the three disjoint bursts illustrated in FIG. 3. The method of the invention has reduced the number of bursts necessary to transmit the input data message, improved the utilization of the channel by reducing the overhead and time delay necessary to set up the transmitter prior to each data burst and reduced the time to transmit the data message, as no gap in time exist in the transmitted data message.

CONCLUSION

The invention provides a novel method for dynamically adjusting the burst duration in response to an input data message being transmitted and to terminate the burst when no data is available for transmission. Further, the invention reduces the transmitter setup overhead necessary for each data burst transmission thus improving channel utilization, while providing for the continuous transmission of burst data in real time.

Those skilled in the art will recognize that there are many configurations of wireless systems not specifically described herein but for which the methodology of the invention may be applied. Although the invention is described in various illustrative embodiments, there is no intent to limit the invention to the precise embodiments disclosed herein. In particular, the invention can be utilized for third-generation mobile or personal communication systems that offer a multitude of data services in different operating scenarios, such as telephony, teleconference, voice mail, program sound, video telephony, video conference, remote terminal, user profile editing, telefax, voiceband data, database access, message broadcast, unrestricted digital information, navigation, location and Internet access services. The burst control methodology of the invention can also be utilized in second-generation systems, or any system that has burst data transfer capability.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved.

What is claimed:

1. In a wireless communication system having a transmitter and at least one receiver operable to be coupled via a communication link, said transmitter capable of acquiring an input data message comprised of a plurality of data packets, a method of dynamically controlling the duration of a burst transmission of said data packets comprising the steps of:

a. assigning a duration to said burst transmission;

b. during said transmission duration, monitoring a source of said input data packets for the presence of at least one additional data packet of said input data message within a known time period; and c. annexing said at least one additional data packet into said burst transmission upon detection within said time period;

wherein said burst duration is assigned to be greater than necessary to transmit an expected plurality of input data packets.

2. The method of controlling a burst duration as recited in claim 1 further comprising the step of:
   restarting said time period commensurate with the presence of said at least one additional data packet within said known time period.

3. The method of controlling a burst duration as recited in claim 1 further comprising the step of:
   extending said assigned burst duration commensurate with a transmission requirement for said at least one additional data packet detected in said time period.

4. The method of controlling a burst duration as recited in claim 1 wherein said known time period is selected in relation to an input data rate of said input data message.

5. The burst duration as recited in claim 1 assigned to be at least one known time period greater than necessary to transmit said expected complement of input data packets.

6. The method of controlling a burst duration as recited in claim 1 further comprising the step of:
   terminating said burst transmission upon termination of said assigned burst duration.

7. The method of controlling a burst duration as recited in claim 1 further comprising the step of:
   terminating said burst transmission when no additional data packets are detected within said known time period.

8. The method of controlling a burst duration as recited in claim 2 wherein restarting of said time period corresponds to the detection of a first of said at least one additional data packet detected within said time period.

9. The method of controlling a burst duration as recited in claim 2 wherein restarting of said time period corresponds to the detection of a last of said at least one additional data packet detected within said time period.

10. The method of controlling a burst duration as recited in claim 2 wherein restarting of said time period corresponds to transmission of a first of said at least one additional data packet detected within said time period.

11. The method of controlling a burst duration as recited in claim 2 wherein restarting of said time period corresponds to transmission of a last of said at least one additional data packet detected within said time period.

12. The method of controlling a burst duration as recited in claim 1 wherein said monitored source of input data packets is a data buffer.

13. The method of controlling a burst duration as recited in claim 1 wherein said communication link is established with respect to a CDMA system.

14. In a wireless communication system having a transmitter and at least one receiver operable to be coupled via a communications link for burst transmission of input data packets, wherein said burst transmission is established in respect to a given burst duration time, a method of terminating a duration of said burst transmission earlier than an end of said burst duration time comprising the steps of:
   a. monitoring a source of said input data packets during said given burst duration time for a presence of at least one additional data packet within a known time period after a last data packet is received from said source, said known time period being less than said burst duration time;
   b. terminating said burst transmission when no additional data packets are detected within said known time period wherein said known time period is selected in relation to an input data rate of said input data packets.

15. The method of terminating a burst duration as recited in claim 14 further comprising the step of:
   restarting said known time period commensurate with a detection of said at least one additional data packet.

16. The method of terminating a burst duration as recited in claim 15 wherein restarting of said time period corresponds to the detection of a first of said at least one additional data packet detected within said time period.

17. The method of terminating a burst duration as recited in claim 15 wherein restarting of said time period corresponds to the detection of a last of said at least one additional data packet detected within said time period.

18. The method of terminating a burst duration as recited in claim 15 wherein restarting of said time period corresponds to transmission of a first of said at least one additional data packet detected within said time period.

19. The method of terminating a burst duration as recited in claim 15 wherein restarting of said time period corresponds to transmission of a last of said at least one additional data packet detected within said time period.

20. The method of terminating a burst duration as recited in claim 14 wherein said monitored source of input data packets is a data buffer.

21. In a wireless communication system having a transmitter and at least one receiver operable to be coupled via a communications link for burst transmission of input data packets, a method of extending an assigned burst duration time comprising the steps of:
   a. monitoring a source of said input data packets for presence of at least one additional data packet within a known time period beginning at a point coincident with an ending of said assigned burst duration time, said known time period being less than said assigned burst duration time; and
   b. adding said known time period to said burst duration upon detection of said at least one additional data packet during said known time period;
   wherein said known time period is selected in relation to an input data rate of said input data packets.

22. The method of extending a burst duration as recited in claim 21 further comprising the steps of:
   restarting said known time period commensurate with the detection of said at least one additional data packet.

23. The method of extending a burst duration as recited in claim 21 further comprising the step of:
   annexing said at least one additional data packet into said burst transmission.

24. The method of extending a burst duration as recited in claim 21 wherein said monitored source of input data packets is a data buffer.

25. In a wireless communication system having a transmitter and at least one receiver operable to be coupled via a communication link, said transmitter capable of acquiring an input data message comprised of a plurality of data packets, a method of dynamically governing the duration of a burst transmission of said data packets comprising the steps of:
   a. during an assigned burst duration time monitoring a source of said input data packets for the presence of at least one additional data packet of said input data message within a known time period, said known time period being less than said assigned burst duration time;
   b. annexing said at least one additional data packet into said burst transmission upon detection of said at least one additional data packet within said known time period; and
   c. extending said burst duration commensurate with said known time period upon detection of said at least one additional data packet within said known ime period wherein said known time period is selected in relation to an input data rate of said input data packets.

26. The method of governing a burst duration as recited in claim 25 wherein steps a through c are iteratively repeated during said burst duration.

27. The method of governing a burst duration as recited in claim 25 wherein said known time period is selected in relation to an input data rate of said input data message.

28. The method of governing a burst duration as recited in claim 25 further comprising the step of:
   terminating said burst duration when additional data packets are not detected within said known time period.

29. In a wireless communication system having a transmitter and at least one receiver operable to be coupled via a communications link for burst transmission of input data packets, a method of terminating a burst transmission short of an assigned burst duration time comprising the steps of:
   a monitoring a source of said input data packets for a presence of at least one additional data packet within a known time period after a last data packet is received from said source, said known time period being less than said assigned burst duration time;
   b. terminating said burst transmission when no additional data packets are detected within said known time period;
   wherein said known time period is restarted commensurate with a detection of said at least one additional data packet and further wherein said known time period is selected in relation to an input data rate of said input data packets.

30. In a wireless communication system having a transmitter and at least one receiver operable to be coupled via a communication link, said transmitter capable of acquiring an input data message comprised of a plurality of data packets, a method of dynamically governing the duration of a burst transmission of said data packets comprising the steps of
   a. during an assigned burst duration time, monitoring a source of said input data packets for the presence of at least one additional data packet of said input data message within a known time period, said known time period being less than said assigned burst duration time;
   b. annexing said at least one additional data packet into said burst transmission upon detection of said at least one additional data packet within said known time period;
   c. extending said burst duration commensurate with at least one of said known time periods upon detection of said at least one additional data packet within said known time period; and
   terminating said burst duration when additional data packets are not detected within said known time period wherein said known time period is selected in relation to an input data rate of said input data packets.

* * * * *